United States Patent
Marukawa et al.

(10) Patent No.: US 12,473,967 B2
(45) Date of Patent: Nov. 18, 2025

(54) OIL COOLER

(71) Applicant: TOYOTA JIDOSHA KABUSHIKI KAISHA, Toyota (JP)

(72) Inventors: Naoki Marukawa, Susono (JP); Hiroto Kusaka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 341 days.

(21) Appl. No.: 18/094,445

(22) Filed: Jan. 9, 2023

(65) Prior Publication Data

US 2023/0287973 A1 Sep. 14, 2023

(30) Foreign Application Priority Data

Mar. 10, 2022 (JP) ................................ 2022-037449

(51) Int. Cl.
| | | |
|---|---|---|
| F16H 57/04 | (2010.01) | |
| B60K 1/00 | (2006.01) | |
| F16H 57/02 | (2012.01) | |
| H02K 5/20 | (2006.01) | |
| H02K 9/19 | (2006.01) | |
| H02K 11/33 | (2016.01) | |

(52) U.S. Cl.
CPC ..... *F16H 57/0415* (2013.01); *F16H 57/0476* (2013.01); *H02K 5/203* (2021.01); *H02K 9/19* (2013.01); *H02K 11/33* (2016.01); *B60K 2001/006* (2013.01); *F16H 2057/02034* (2013.01); *F16H 2057/02052* (2013.01)

(58) Field of Classification Search
None
See application file for complete search history.

(56) References Cited

U.S. PATENT DOCUMENTS 10,879,769 B2 * 12/2020 Ishikawa ............. H02K 9/19
11,680,510 B1 * 6/2023 Takagi ................. F01P 7/165
123/41.44

FOREIGN PATENT DOCUMENTS

| CN | 207437743 U | * | 6/2018 |
| JP | H02-126024 U | | 10/1990 |
| JP | 2020-174478 A | | 10/2020 |
| JP | 2021-052521 A | | 4/2021 |

OTHER PUBLICATIONS

Machine translation of CN-207437743-U (Year: 2018).*

* cited by examiner

*Primary Examiner* — Bernard Rojas
(74) *Attorney, Agent, or Firm* — Dinsmore & Shohl LLP

(57) ABSTRACT

An oil cooler for cooling an oil with a cooling water, the oil being for lubricating a transaxle in a state of being attached to the case for accommodating the transaxle, includes: an oil inlet opening on a mounting surface attached to the case; an oil outlet opening on the mounting surface; a first opening, which is an opening on the mounting surface, for cooling water; and a second opening, which is an opening on a portion other than the mounting surface, for cooling water. Further, a heat exchange is performed between the oil flowing through an oil passage connecting the oil inlet and the oil outlet and the cooling water flowing through a water passage connecting the first opening and the second opening.

3 Claims, 5 Drawing Sheets

OIL COOLER

CROSS-REFERENCE TO RELATED APPLICATION(S)

The present application claims priority to and incorporates by reference the entire contents of Japanese Patent Application No. 2022-037449 filed in Japan on Mar. 10, 2022.

BACKGROUND

The present disclosure relates to an oil cooler.

Japanese Laid-open Patent Publication No. 2021-052521 discloses an oil cooler in which the oil is cooled by cooling water in a state of being attached to a case accommodating the transaxle and the oil.

In this oil cooler, an oil inlet, an oil outlet, a cooling water inlet, and a cooling water outlet are opened in the mounting surface to be attached to the case.

SUMMARY

There is a need for providing an oil cooler capable of suppressing the increase in size of the body.

According to an embodiment, an oil cooler for cooling an oil with a cooling water, the oil being for lubricating a transaxle in a state of being attached to the case for accommodating the transaxle, includes: an oil inlet opening on a mounting surface attached to the case; an oil outlet opening on the mounting surface, a first opening, which is an opening on the mounting surface, for cooling water; and a second opening, which is an opening on a portion other than the mounting surface, for cooling water. Further, a heat exchange is performed between the oil flowing through an oil passage connecting the oil inlet and the oil outlet and the cooling water flowing through a water passage connecting the first opening and the second opening.

DETAILED DESCRIPTION

In the configuration described in Japanese Laid-open Patent Publication No. 2021-052521, since the cooling water introduced from the case to the oil cooler is returned to the case after the heat exchange, the cooling water flows, in the order of the case, the oil cooler, and the case. In other words, the case needs to have a cooling water inlet (IN) and a cooling water outlet (OUT) that connect to a member other than the oil cooler as the inlet and the outlet of the cooling water. In this case, the number of openings becomes ten including four on the oil cooler side and six on the case side, and thus there is a possibility that leads to increase in size and cost of the body.

Hereinafter, an oil cooler in an embodiment of the present disclosure will be specifically described with reference to the drawings. Note that the present disclosure is not limited to the embodiments described below.

Figure 1:
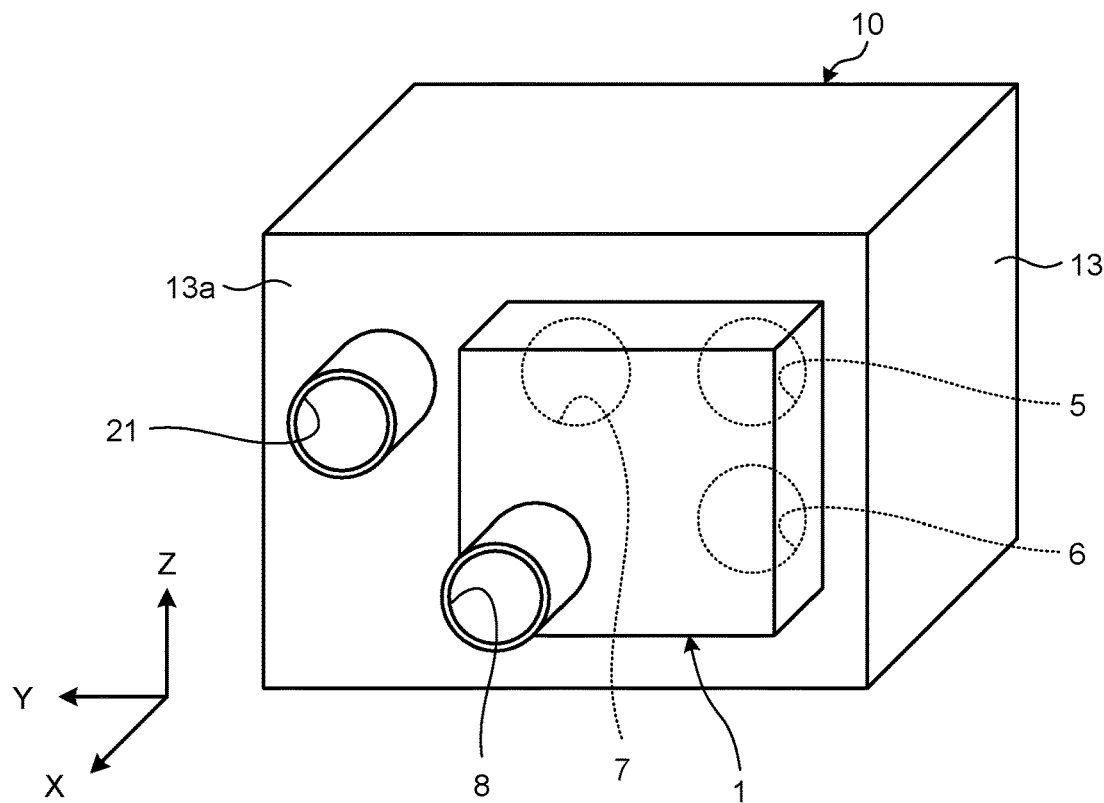
FIG. 1 is a diagram schematically illustrating a state in which an oil cooler is attached to a case of a machine electric integral structure.

FIG. 1 is a diagram schematically illustrating a state in which an oil cooler is attached to a case of a machine electric integral structure. The oil cooler 1 is applied to the driving unit 10 of the electric vehicle, to cool the oil of the driving unit 10 by the cooling water.

Figure 2:
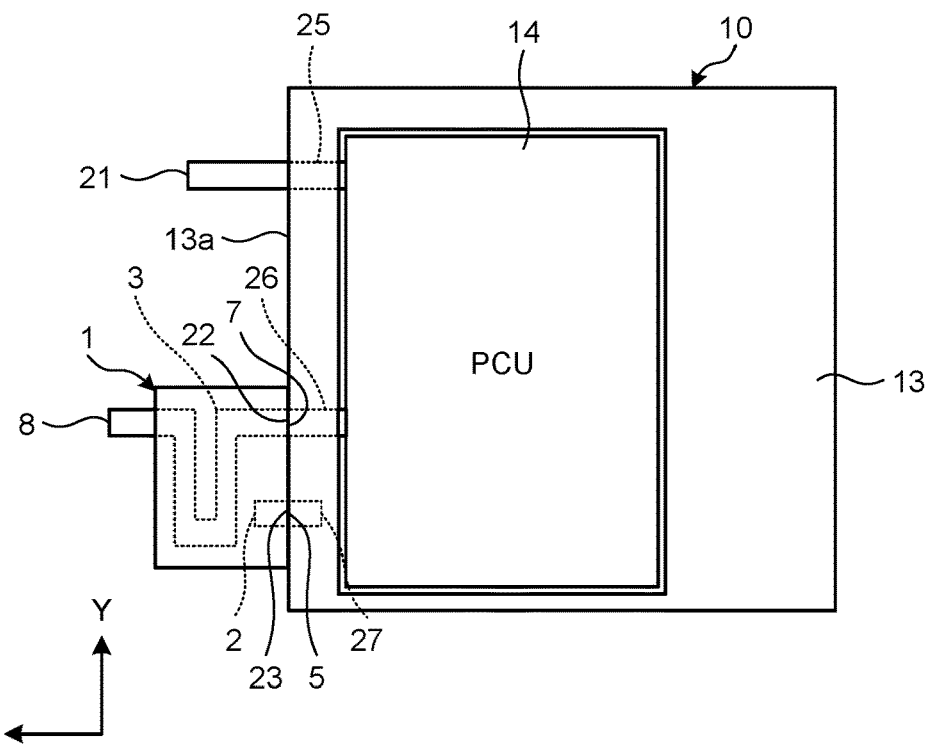
FIG. 2 is a top view schematically illustrating a state in which an oil cooler is attached to a case of a machine electric integral structure.
Figure 3:
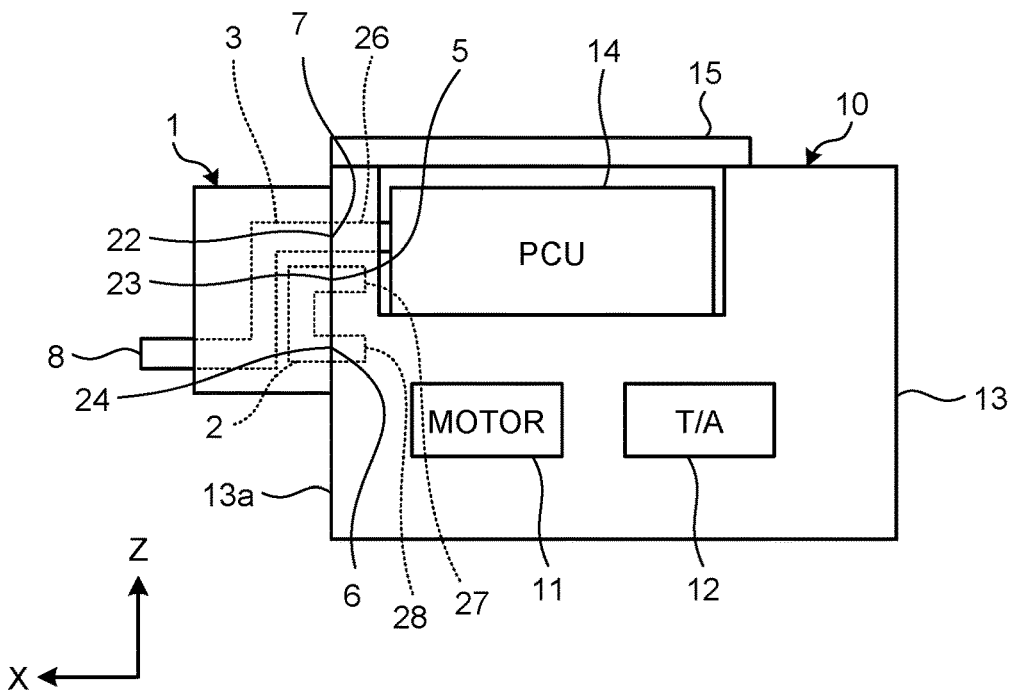
FIG. 3 is a side view schematically illustrating a state in which the oil cooler in the embodiment is attached to the case of the machine electric integral structure.

The drive unit 10 includes, as illustrated in FIGS. 2 and 3, a motor 11, a transaxle (T/A) 12, a case 13 housing the motor 11 and the transaxle 12, and a power control unit (hereinafter referred to as PCU) 14. The drive unit 10 is an electromechanical unit in which a PCU 14 is housed in a case 13 which houses the motor 11 and the transaxle 12. Incidentally, the "X direction" refers to the front and rear directions of the electric vehicle, the "Y direction" refers to the right of the vehicle width direction of the electric vehicle, the "Z direction" represents the upper height direction of the electric vehicle.

The motor 11 is a power source of the electric vehicle. The transaxle 12 is a power transmission mechanism including a gear and a rotary shaft, and transmits power output from the motor 11 to the wheels. The PCU 14 is a power converter for controlling the motor 11, and includes inverters and converters. The PCU 14 is electrically connected to the motor 11, and converts the power of the battery and supplies it to the motor 11. The PCU 14 functions as a power controller for controlling the power of the motor 11.

Then, the PCU 14 is accommodated inside the case 13.

The case 13 has a motor chamber to accommodate motor 11, a gearing chamber to accommodate the transaxle 12, and a PCU chamber to accommodate the PCU 14. The case 13 is formed to include a cover member 15 disposed so as to close the upper portion of PCU chamber. The cover member 15 is attached to the case body portion of the case 13 by bolt fastening. Incidentally, the cover member 15 is omitted in FIG. 2.

Thus, the case 13 is a case of a machine-electric integral construction in which a case body portion (transaxle case) for accommodating the motor 11 and the transaxle 12 and a case body portion (PCU case) for accommodating the PCU 14 are integrally molded. Therefore, the PCU 14 disposed in the case 13 can be expressed as a PCU 14 accommodated in the transaxle case. Further, the wall portion of the case 13 is a wall portion in which the wall portion of PCU case and the wall portion of the transaxle case are shared.

In the case 13, a common oil is accommodated in the motor chamber and the gear chamber. The case 13 is formed to allow oil to flow between the gear chamber and the motor chamber. Therefore, the oil cools the motor 11 in the motor chamber, and the oil lubricates the transaxle 12 in the gear chamber. In other words, the oil introduced into the oil cooler 1 is a cooling oil for cooling the motor 11 and a lubricating oil for lubricating the transaxle 12. In short, the oil has an insulating property.

Further, in the PCU chamber of the case 13, the PCU 14 is cooled by the coolant. The PCU 14 is provided with a cooling channel (water channel) through which the cooling water flows, and the power module of PCU 14 can be cooled down by the cooling water flowing through the cooling channel. In other words, the PCU 14 is water-cooled and connected to the cooling circuitry where the cooling water circulates. The cooling-circuit includes a water pump, a radiator, the oil cooler 1, and the PCU 14.

Since the radiator is disposed at the front of the electric vehicle, the oil cooler 1 and the drive unit 10 are disposed at the front of the electric vehicle.

In the cooling circuit, the cooling water pumped by the water pump circulates. Cooling water after PCU 14 is cooled is pumped to the radiator to radiate heat. Then, the cooling water cooled by the radiator is supplied to the PCU 14 to cool the PCU 14.

The coolant is, for example, an LLC.

The oil cooler 1 is mounted on the case 13 and cools the oil of the motor 11 and the transaxle 12 with PCU 14 coolant. The oil cooler 1 has an oil passage 2 through which oil flows and a water passage 3 through which cooling water flows. In the oil cooler 1, heat exchange is performed between oil flowing through the oil passage 2 and cooling water flowing through the water passage 3.

Further, the oil cooler 1 includes a mounting surface 4 which is attached to the wall of the case 13. For example, the oil cooler 1 includes a base plate portion which is bolted to the front wall portion of the case 13, of the base plate portion, the surface facing the wall surface 13a of the front wall portion of the case 13 is the mounting surface 4. The mounting surface 4, an opening of the opening and the water channel 3 of the oil channel 2 is opened.

Figure 4:
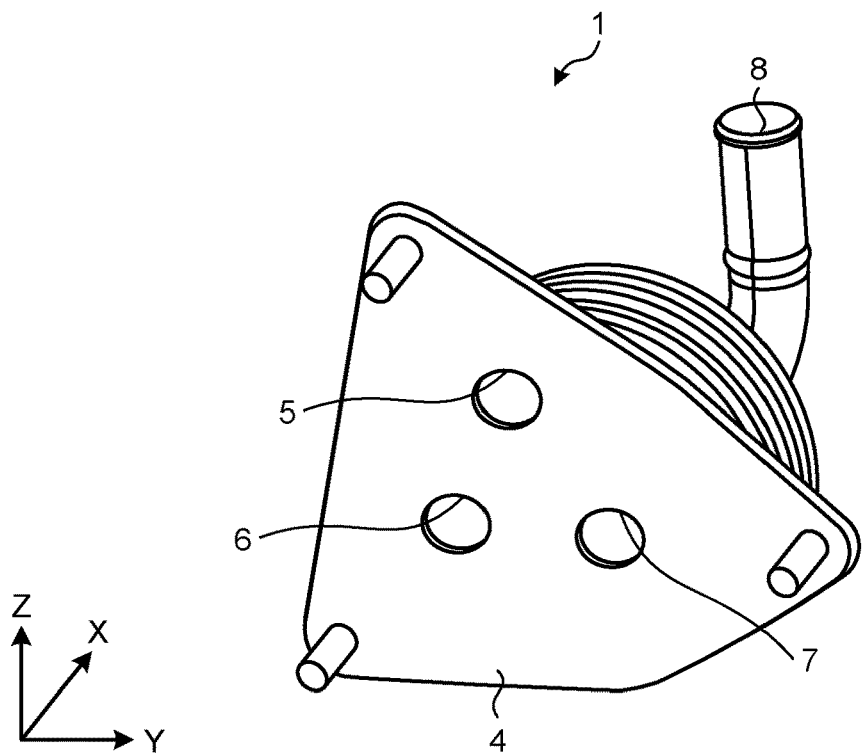
FIG. 4 is a diagram illustrating the structure of an oil cooler.

The oil cooler 1 includes an oil inlet 5, an oil outlet 6, a cooling water inlet 7, and a cooling water outlet 8, as illustrated in FIG. 4.

The oil inlet port 5 is an opening that opens to the mounting surface 4 and introduces oil into the oil cooler 1. The oil inlet 5 is disposed at a position facing the oil supply port 23 of the case 13 side in the X direction. In the Y direction, the oil inlet port 5 is disposed at a position different from the cooling water inlet port 7.

In the Z direction, the oil inlet port 5 may not be disposed at the same position as the cooling water inlet port 7.

The oil discharge port 6 is an opening that opens to the mounting surface 4 and discharges oil to the outside of the oil cooler 1.

The oil outlet port 6 is disposed at a position facing the oil return port 24 of the case 13 side in the X direction.

In the Z direction, the oil discharge port 6 is disposed at a position different from the oil inlet 5. In the Y direction, the oil outlet port 6 may not be disposed at the same position as the oil inlet port 5.

The cooling water inlet 7 is an opening that opens to the mounting surface 4, and introduces the cooling water into the oil cooler 1. The cooling water inlet 7 is a first opening for cooling water. The cooling water inlet 7 is disposed at a position facing the cooling water supply port 22 of the case 13 side in the X direction.

The cooling water discharge port 8 is an opening that opens to a part different from the mounting surface 4, and discharges the cooling water to the outside of the oil cooler 1. For example, the cooling water outlet 8 on the side opposite to the mounting surface 4 can be configured to open. The cooling water outlet 8 is a second opening for cooling water.

Inside the oil cooler 1, the oil passage 2 is formed so as to connect the oil inlet 5 and the oil outlet 6, and the water passage 3 is formed so as to connect the cooling water inlet 7 and the cooling water outlet 8. The oil passage 2 communicates with the oil inlet port 5 and the oil outlet port 6, and includes a heat exchange oil passage in which oil exchanges heat with cooling water in the water passage 3. The water passage 3 communicates the cooling water inlet 7 and the cooling water outlet 8, and includes a heat exchange water passage in which the cooling water exchanges heat with oil in the oil passage 2.

Figure 5:
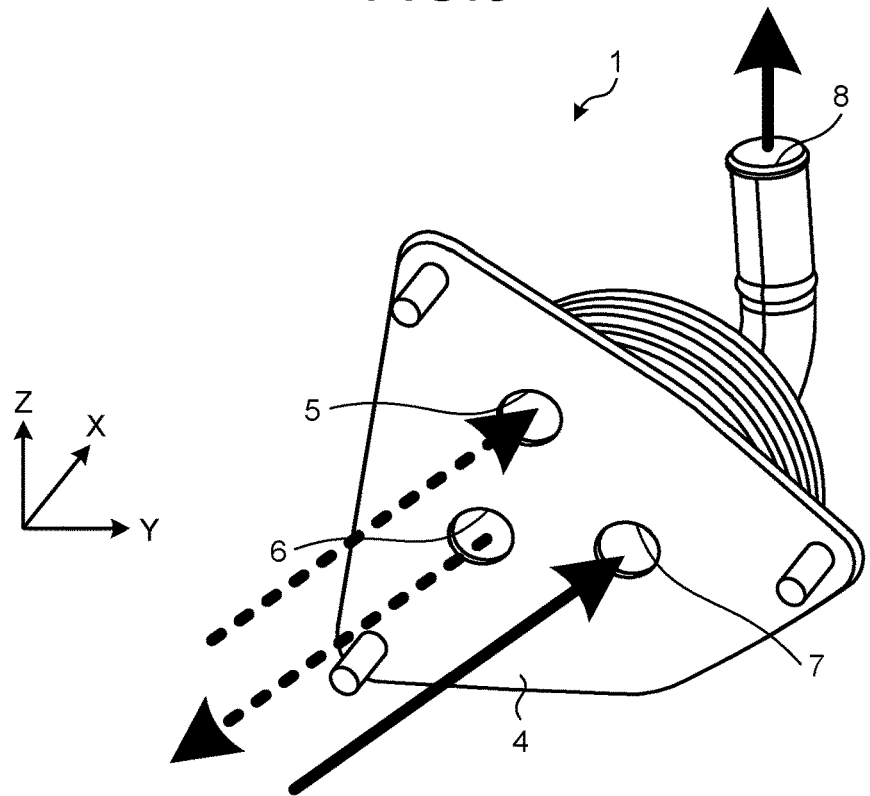
FIG. 5 is a diagram illustrating the flow of oil and the flow of the cooling liquid with respect to the opening of the oil cooler.
Figure 6:
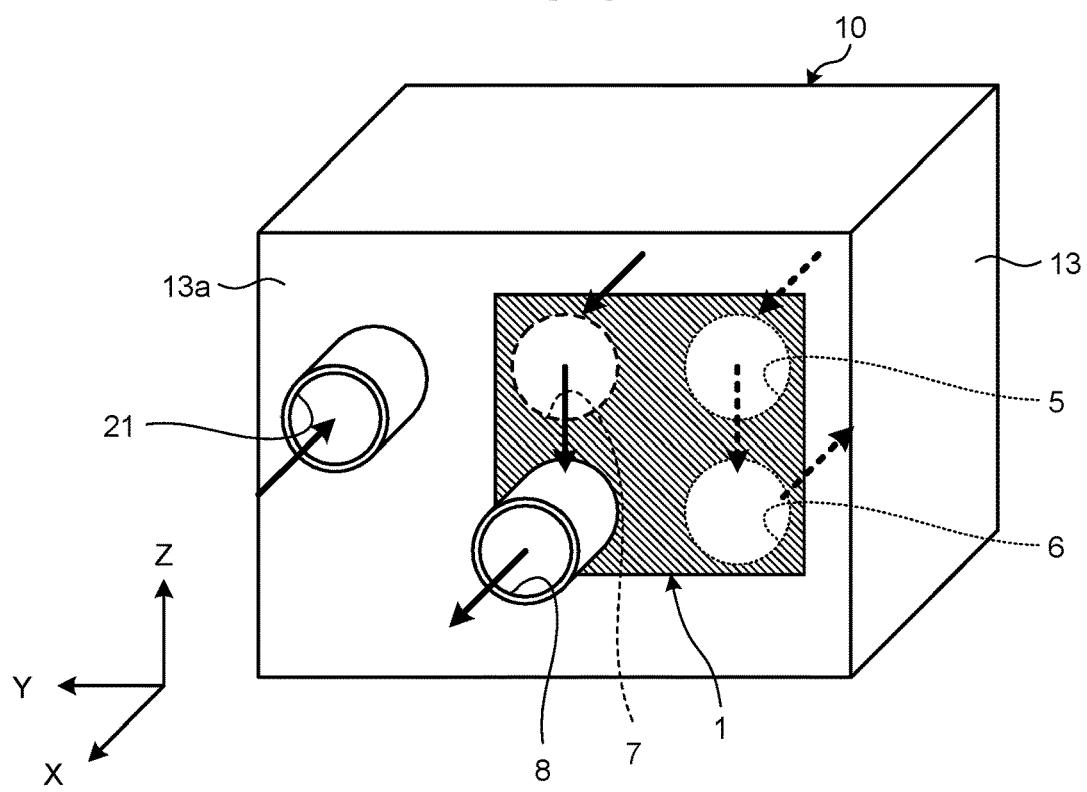
FIG. 6 is a diagram for explaining a flow of oil and a flow of a cooling liquid in a state in which an oil cooler is mounted to a case of an electromechanical integral structure.

Regarding the exchange of oil between the oil cooler 1 and the case 13, the oil is introduced from the case 13 into the oil inlet port 5 of the oil cooler 1 to flow through the oil passage 2 of the oil cooler 1, as indicated by an arrow indicated by a broken line in FIGS. 5 and 6. Oil flowing through the oil passage 2 in the oil cooler 1 is discharged from the oil outlet port 6 which opens to the mounting surface 4 and is returned to the case 13. Incidentally, in FIG. 6, for convenience of explanation, the oil cooler 1 is illustrated in a simplified diagram hatched.

For exchange of the cooling water between the oil cooler 1 and the case 13, the cooling water is introduced from the case 13 into the cooling water inlet port 7 of the oil cooler 1 to flow through the water passage 3 of the oil cooler 1, as indicated by the directions of arrow illustrated by solid lines in FIGS. 5 and 6. Cooling water flowing through the water channel 3 in the oil cooler 1 is discharged from the cooling water discharge port 8 which opens to the side opposite to the mounting surface 4. The cooling water outlet 8 is connected to a member separate from the case 13.

Figure 7:
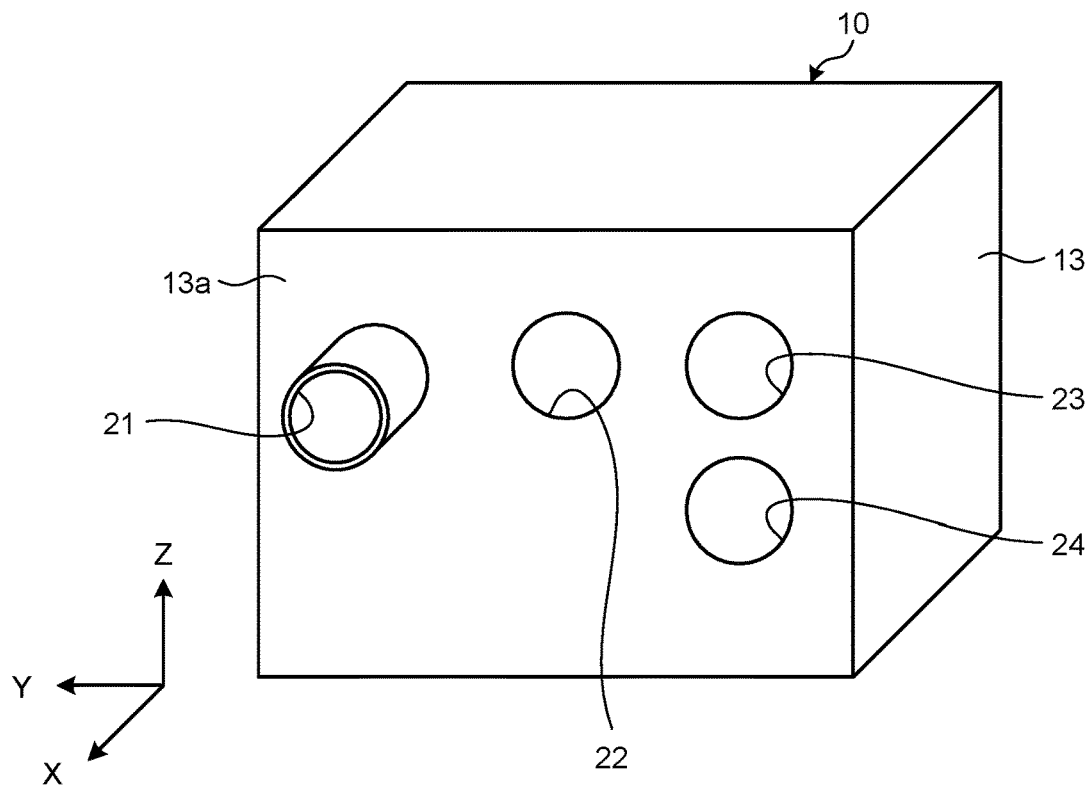
FIG. 7 is a diagram for explaining the structure of the case.

As illustrated in FIG. 7, the case 13 includes a cooling water inlet 21, a cooling water supply port 22, an oil supply port 23, and an oil return port 24 as openings which are opened on the wall surface 13a of the front wall to which the oil cooler 1 is attached.

The cooling water inlet port 21 is an opening that opens at a position where the oil cooler 1 is not mounted among the wall surface 13a, and is connected to a member separate from the oil cooler 1. Cooling water inlet 21 is connected to the upstream side member than the case 13 in the cooling circuit in which the cooling water circulates. The cooling water inlet port 21 introduces the cooling water after being cooled by the radiator into the case 13.

Further, the cooling water inlet 21 communicates with PCU 14 through the first case water channel 25 formed inside the case 13, as illustrated in FIG. 2. Cooling water flowing from the cooling water inlet 21 into the first case water channel 25 is supplied to PCU 14.

Upstream of PCU 14 water channel communicates with the cooling-water inlet 21 through the first case water channel 25. Downstream of PCU 14 water channel communicates with the cooling water supply port 22 through the second case water channel 26 formed inside the case 13.

Furthermore, in the Y direction and the Z direction, at a position overlapping the position where PCU 14 is disposed, and the first case water channel 25 and the second case water channel 26 is disposed. Then, the first case water channel 25 and the second case water channel 26 extends in a direction perpendicular to the mounting surface 4 of the oil cooler 1. If the mounting surface 4 is a plane extending in Y-Z plane, the first case water channel 25 and the second case water channel 26 extends along the X-direction.

For example, the cooling water inlet 21 is disposed at a position overlapping PCU 14 in the Y direction and the Z direction, and the first case water channel 25 is formed so as to connect the cooling water inlet 21 and PCU 14 in the shortest path. Further, the cooling water supply port 22 is disposed at a position overlapping PCU 14 in the Y direction and the Z direction, and the second case water channel 26 is formed so as to connect PCU 14 and the cooling water supply port 22 with the shortest path. Thus, the cooling water introduced from the cooling water inlet 21, the first case water channel 25, PCU 14, flows in the order of the second case water channel 26.

The cooling water supply port 22 is an opening that opens at a position where the oil cooler 1 is mounted among the wall surface 13*a*, and is a cooling water connection port that connects to the cooling water introduction port 7 of the oil cooler 1. By the cooling water supply port 22 and the cooling water introduction port 7 are connected, the second case water channel 26 and the water channel 3 of the oil cooler 1 communicate with each other. The cooling water supply port 22 and the cooling water inlet 7 are disposed to face each other and directly connected to each other. Directly connected means that it is connected without via a member forming a flow path such as a hose.

By the cooling water inlet 7 being directly connected to the cooling water supply port 22, the hoses connecting the oil cooler 1 and the case 13 and the hoses connecting the oil cooler 1 and PCU 14 can be reduced, thereby simplifying the construction. Therefore, it is possible to connect the cooling water supply port 22 and the cooling water introduction port 7 in a state of being sealed by the sealing material. In other words, the cooling water supply port 22 and the cooling water introduction port 7 can be connected to each other through a sealing material.

This is not limited to the cooling water supply port 22, but the same applies to the oil supply port 23 and the oil return port 24.

The oil feed port 23 is an opening that opens at a position where the oil cooler 1 is mounted among the wall surface 13*a*, and is connected to the oil inlet port 5 of the oil cooler 1. By connecting the oil supply port 23 and the oil inlet 5, the supply oil passage 27 formed inside the case 13 communicates with the oil passage 2 of the oil cooler 1. The oil supply port 23 and the oil inlet 5 are arranged so as to face each other and are directly connected to each other.

The oil return port 24 is an opening that opens at a position where the oil cooler 1 is mounted among the wall surface 13*a*, and is connected to the oil discharge port 6 of the oil cooler 1. By connecting the oil return port 24 with the oil discharge port 6, the return oil passage 28 formed inside the case 13 communicates with the oil passage 2 of the oil cooler 1. The oil return port 24 and the oil discharge port 6 are disposed to face each other and directly connected to each other.

Figure 8:
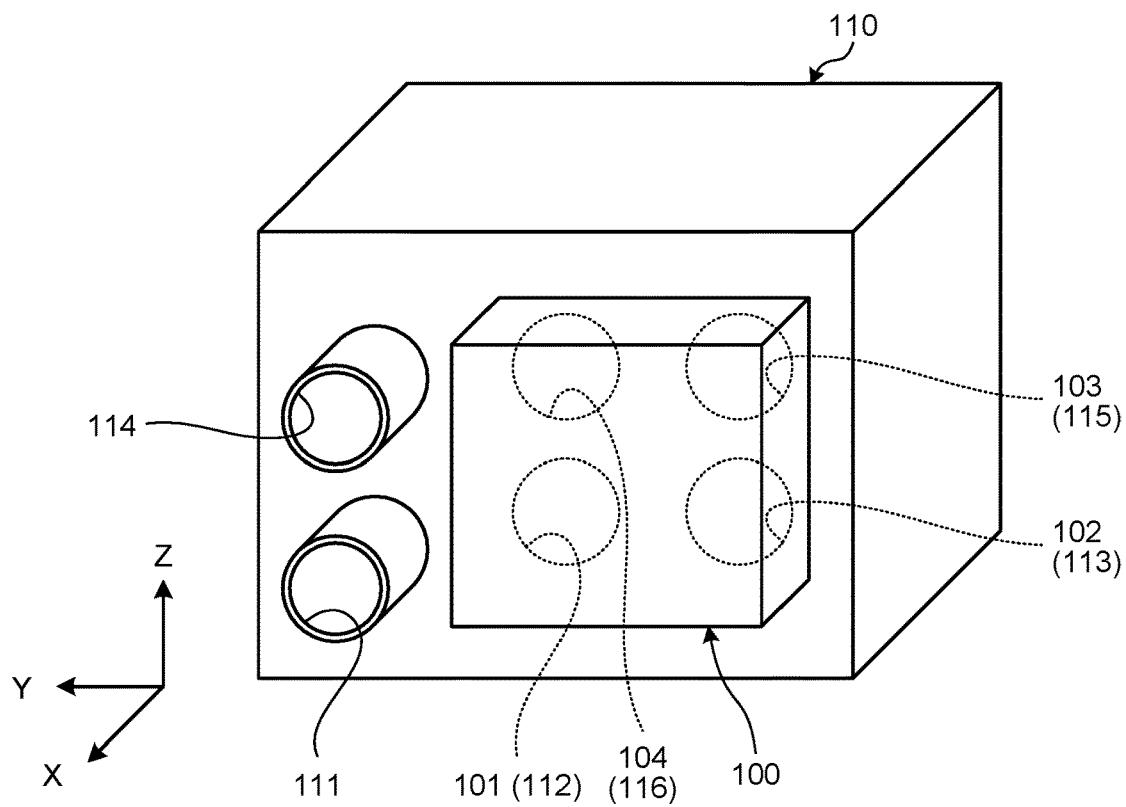
FIG. 8 is a diagram schematically illustrating the structure of a comparative example.
Figure 9:
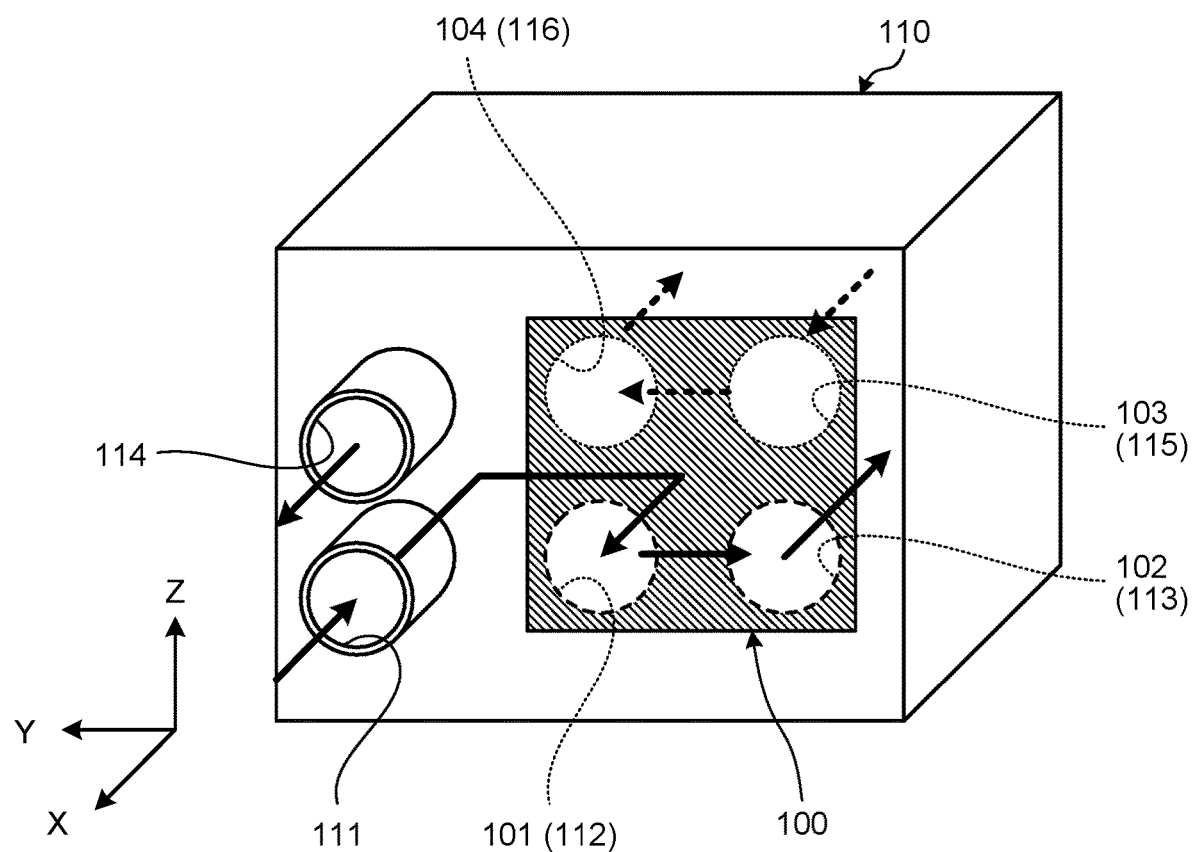
FIG. 9 is a diagram illustrating the oil flow and the cooling liquid flow in the structure of the comparative example.

As illustrated in FIGS. 8 and 9, in the oil cooler 100 of the comparative example, the cooling water inlet 101, the cooling water outlet 102, the oil inlet 103, and the oil outlet 104 are opened to the surface mounted to the case 110. The case 110 includes a cooling water inlet 111, a cooling water supply port 112, a cooling water return port 113, a cooling water discharge port 114, an oil supply port 115, and an oil return port 116. The cooling water inlet 111 and the cooling water outlet 114 are opened to a position where the oil cooler 100 is not mounted. The cooling water supply port 112, the cooling water return port 113, the oil supply port 115, and the oil return port 116 are opened at a position where the oil cooler 100 is mounted. Then, the cooling water flows in the paths of the cooling water inlet 111, the case 110, the cooling water supply port 112, the cooling water inlet 101, the oil cooler 100, the cooling water discharge port 102, the cooling water return port 113, the case 110, and the cooling water discharge port 114, as indicated by the solid arrows in FIG. 9. In the structure of the comparative example, the number of openings becomes ten in total of four of the oil cooler 100 and six of the case 110.

Thus, the oil cooler 1 of the embodiment can reduce two openings in comparison with the structure of the comparative example.

Further, the wall surface of the front wall of the case 110 in the structure of the comparative example, the water channel pipe forming a flow path of the cooling water needs to be arranged two total of the inlet side (IN) and the outlet side (OUT). Therefore, since the mounting space of each component is also reduced when the driving unit is miniaturized by the electric vehicle is miniaturized, there is a high possibility that the oil cooler 100 and the water pipe interfere with each other at the wall of the case 110.

Especially, when a radiator is arranged in front of an electric vehicle, a water channel and an oil cooler are often arranged in front of an electric vehicle, so that even any electric vehicle becomes a problem in mounting.

In contrast, in the oil cooler 1 of the embodiment, the passage in which the cooling water flows, the water pipe, the case 13, PCU 14, the case 13, the oil cooler 1, the order of the water pipe, the wall portion of the case 13 it is possible to avoid the oil cooler 1 and the water pipe from interfering.

As described above, according to the embodiment, the number of openings, four in the oil cooler 1, four in the case 13, can be a total of eight. Thus, it is possible to suppress an increase in size of the body, it is possible to reduce the cost. Furthermore, since the number of openings to be opened in the mounting surface 4 can be three, it is possible to reduce the mounting surface 4, it is possible to suppress an increase in size of the body.

Further, according to the embodiment, since the arrangement in the X direction can be configured to arrange PCU 14 immediately after the oil cooler 1, the water passage between the oil cooler 1 and PCU 14 can be connected with the shortest route. Thus, since the volume can be reduced, it is possible to reduce the size of the body.

Incidentally, the electric vehicle to which the oil cooler 1 can be applied, an electric vehicle (BEV), a hybrid vehicle (HEV), a plug-in hybrid vehicle (PHEV), may be any of the fuel-cell vehicle (FCEV).

The direction in which the cooling water flows and the direction in which the oil flows are not limited to the directions illustrated in FIGS. 5 and 6. For example, the cooling water may be discharged from the cooling water inlet 7 by introducing the cooling water from the cooling water outlet 8 of the oil cooler 1. In this case, the cooling water is circulated in the order of the radiator, the oil cooler 1, the case 13, PCU 14, and the case 13.

In short, the oil cooler 1 may be a structure having a first opening for cooling water which opens into the mounting surface 4, and a second opening for cooling water which opens into a different site from the mounting surface 4, either of the first opening and the second opening may be an inlet. Similarly, oil may be introduced from the oil discharge port 6 of the oil cooler 1 to discharge the oil from the oil introduction port 5.

Further, the supply oil passage 27 and the return oil passage 28 formed in the case 13, its shape and connection destination is not particularly limited. For example, the supply oil passage 27 communicates with a catch tank formed in the gear chamber. Of the case 13, oil scraped up by the gear in the gear room accumulates in the catch tank. Oil accumulated in the catch tank flows into the supply oil passage 27. The return oil passage 28 communicates with a cooling pipe in the motor chamber of the case 13.

The cooling pipe supplies (injects) oil from above the motor toward the stator. Since the oil injected from the cooling pipe to the stator of the motor (for example, the coil end) is the oil after being cooled by the oil cooler 1, the cooling of the motor is improved. Oil flowing through the supply oil passage 27 and the return oil passage 28 of the case 13 may be pumped by an oil pump.

It is possible to configure the oil to be pumped by the oil pump from the catch tank to the supply oil passage 27, the oil passage 2 of the oil cooler 1, the return oil passage 28, and the cooling pipe. When the oil is pumped from the oil pump, the oil to be stored in the oil reservoir formed in the lower portion of the gear chamber, not in the catch tank, may be sucked by the oil pump and discharged to the supply oil passage.

The case 13 is not limited to a structure in which a part functioning as a transaxle case and a part functioning as a PCU case are integrally molded. That is, the case body portion of the case 13 may be a structure formed by combining a plurality of members. Therefore, the case body portion which functions as a transaxle case may have a structure in which a member forming the motor chamber and a member forming the gear chamber are integrated. In short, for the water passage and the oil passage through which the cooling liquid flows, the flow path formed inside the case 13 may be formed so as to communicate via a plurality of members.

Further, although the oil cooler 1 has been described the structure attached to the front wall portion of the case 13 is not limited thereto. The oil cooler 1 may be mounted on the rear wall of the case 13. That is, the oil cooler 1 may not be attached to the same wall portion as the cooling water inlet 21 of the case 13.

The cooling water inlet 21 of the case 13 is not limited to the structure provided on the front wall portion of the case 13. For example, it may be a structure in which the cooling water inlet 21 is provided in the side wall portion of the case 13 in the embryo rear wall portion. In short, the cooling water inlet 21 may not necessarily be provided on the wall to which the oil cooler 1 is attached.

Further, although the case 13 is a case of a machine-electric integral structure is described, it is not limited thereto. The case 13 may contain at least one of the motor 11 and the transaxle 12, and may not necessarily contain the PCU 14.

In short, the oil cooler 1 is not limited to the drive unit 10 of the electromechanical integrated structure is applicable to other drive units.

Therefore, the cooling water may be any cooling water for cooling the oil in the case 13, not necessarily for cooling the PCU 14.

In the present disclosure, it is possible to reduce the number of openings opened in the surface to be attached to the case to three, it is possible to reduce the mounting surface, and it is possible to suppress the enlargement of the body size. Further, in the unit structure in which the oil cooler is integrated with the case, the second opening functions as the cooling water inlet or the cooling water outlet in the unit structure. In this case, the number of openings becomes four on the oil cooler side, four on the case side, a total of eight, can be made compact size, thereby reducing costs.

According to an embodiment, it is possible to the number of openings to be opened in the surface attached to the case to three, it is possible to reduce the mounting surface, and it is possible to suppress the enlargement of the body size. Further, in the unit structure in which the oil cooler is integrated with the case, the second opening functions as the cooling water inlet or the cooling water outlet in the unit structure. In this case, the number of openings becomes four on the oil cooler side, four on the case side, a total of eight, can be made compact size, thereby reducing costs.

According to an embodiment, it is possible to cool the oil of the transaxle and the motor by the cooling water of the power conversion device while the oil cooler is attached to the case of the state electric integral structure.

According to an embodiment, it is possible to communicate the cooling flow passage of the power converter and the water passage of the oil cooler through the water passage formed inside the case.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An oil cooler for cooling an oil with a cooling water, the oil being for lubricating a transaxle in a state of being attached to a case for accommodating the transaxle, the oil cooler comprising:
    an oil inlet opening on a mounting surface attached to the case;
    an oil outlet opening on the mounting surface;
    a first opening, which is an opening on the mounting surface, for cooling water; and
    a second opening, which is an opening on a portion other than the mounting surface, for cooling water, wherein
    a heat exchange is performed between the oil flowing through an oil passage connecting the oil inlet opening and the oil outlet opening and the cooling water flowing through a water passage connecting the first opening and the second opening,
    the case houses a motor, a PCU, which is a power conversion device for controlling the motor, and the transaxle,
    the oil inlet opening is connected to an oil supply port provided on the case,
    the oil outlet opening is connected to an oil return port provided on the case,
    the oil is supplied to a motor chamber accommodating the motor in an internal space of the case to cool the motor,
    the PCU is provided with a cooling flow path for passing the cooling water,
    the cooling flow path is in communication with the first opening via a case water channel formed in the case,
    the first opening is connected to a cooling water supply port formed on the case and is in communication with the cooling flow path via the cooling water supply port and the case water channel,
    the cooling water is supplied to the PCU to cool the PCU, and
    the second opening is open to a side opposite to the mounting surface and is connected to a member other than the case.

2. The oil cooler according to claim 1, wherein
    the case water channel is formed in a manner that the PCU and the first opening are connected to each other in a shortest route.

3. The oil cooler according to claim 2, wherein
    the motor is a power source of an electric vehicle, and the case water channel and the first opening are disposed at a position where the PCU is disposed in a vehicle width direction of the electric vehicle and in a height direction of the electric vehicle.

* * * * *